United States Patent [19]

Kanamori

[11] Patent Number: 4,515,236
[45] Date of Patent: May 7, 1985

[54] REAR SUSPENSION FOR MOTORCYCLES

[75] Inventor: Takashi Kanamori, Hamamatsu, Japan

[73] Assignee: Yamaha Hatsudoki Kabushiki Kaisha, Japan

[21] Appl. No.: 453,934

[22] Filed: Dec. 28, 1982

[30] Foreign Application Priority Data

Dec. 29, 1981 [JP] Japan .................. 56-214668

[51] Int. Cl.³ ............................... B62K 25/04
[52] U.S. Cl. ...................... 180/227; 280/284
[58] Field of Search ............... 180/227, 219; 280/284, 280/285, 286, 288

[56] References Cited

U.S. PATENT DOCUMENTS

| | | | |
|---|---|---|---|
| 4,076,271 | 2/1978 | Doneque | 280/284 |
| 4,212,481 | 7/1980 | Ribi | 280/276 |
| 4,360,214 | 11/1982 | Isono | 280/284 |
| 4,440,413 | 4/1984 | Miyakoshi | 180/227 X |

FOREIGN PATENT DOCUMENTS

56-60785  8/1980  Japan .
55-117382 5/1981  Japan .
56-103679 8/1981  Japan .

*Primary Examiner*—David M. Mitchell
*Assistant Examiner*—Mitchell J. Hill
*Attorney, Agent, or Firm*—Ernest A. Beutler

[57] ABSTRACT

An improved linkage type suspension arrangement for the rear wheel of a motorcycle that permits a large suspension travel and effective damping without transmission of high loads to the vehicle frame. A linkage system is employed including a bellcrank and link for loading the suspension element upon the suspension movement. The bellcrank has its intermediate pivotal connection to a trailing arm of the suspension and one of its arms pivotally connected to the suspension element and its other arm pivotally connected to a link which is, in turn, pivotally connected to the vehicle frame.

3 Claims, 5 Drawing Figures

REAR SUSPENSION FOR MOTORCYCLES

BACKGROUND OF THE INVENTION

This invention relates to a rear suspension for motorcycles and more particularly to an improved motorcycle rear wheel suspension system.

In a motorcycle suspension system, as with any suspension system for a wheeled vehicle, it is desirable to cushion the movement of the wheel over a long a stroke as possible of the suspension element. "Suspension element" as used herein, is intended to encompass a spring, a shock absorber, or a combination of spring and shock absorber. By providing a long travel for the suspension element, it is possible to provide a softer ride through the use of lower spring rates. However, it is not always desirable to provide too soft a ride and it has been proposed to employ non-linear suspension systems. The term "non-linear suspension system" refers to a suspension system wherein the amount of suspension travel is not linearly related to the load at the rear wheel. Normally, it has been the practice to provide a suspension system wherein the rate of the suspension system increases toward the end of the suspension travel. This is done to reduce the likelihood of abrupt bottoming at the end of the suspension travel. Non-linear suspension systems may be achieved in a variety of functions. One way in which such a non-linear rate may be achieved is through the use of a linkage system that is interposed between the rear wheel and the suspension element for loading the suspension element in a non-linear fashion.

With a vehicle such as a motorcycle, the overall compactness oftentimes compromises the location of the suspension element. With some of the previously proposed suspension systems using linkage systems to load the suspension element, it has been necessary to position the suspension element so that its axis of action extends in a generally vertical direction and the suspension element is positioned directly in front of the rear wheel. With such vertical placement, it has been impossible to obtain the necessary long length of suspension element travel. As a result, the linkage systems employed with such suspension arrangements give rise to extreme shocks at the end of the suspension travel both upon the suspension element and upon the linkage system which loads it.

It is, therefore, a principal object of this invention to provide an improved suspension arrangement for vehicles.

It is another object of this invention to provide a vehicular suspension system in which a long suspension travel is achieved.

It is another object of this invention to provide an improved, non-linear rate suspension system, particularly adapted for use in motorcycles.

SUMMARY OF THE INVENTION

This invention is adapted to be embodied in a rear suspension for a motorcycle that includes a suspension arm supported for pivotal movement about a first pivot axis that extends transversely to the motorcycle and which journals a rear wheel for rotation about an axis that is parallel to the first pivot axis. A suspension element is provided for yieldably resisting pivotal movement of the suspension arm. In accordance with the invention, a linkage system is provided for loading the suspension element upon pivotal movement of the suspension arm. The linkage system includes a bellcrank that has its intermediate portion connected to the suspension arm for pivotal movement about a second pivot axis that is disposed rearwardly from the first axis and which is positioned below a line interconnecting the first pivot axis with the axis of rotation of the wheel. One arm of the bellcrank has a pivotal connection to one end of the suspension element for loading the suspension element upon pivotal movement of the bellcrank about the second pivot axis. The pivotal connection between the one bellcrank arm and the suspension element is on a third pivot axis that is disposed rearwardly of the second pivot axis and above the line connecting the first pivot axis with the axis of rotation of the wheel. The other arm of the bellcrank has a connection to one end of a link as a fourth pivot axis. The fourth pivotal axis lies forwardly of the second and third pivot axes and is disposed below the line interconnecting the first pivot axis with the rotational axis of the rear wheel. The other end of the link is pivotally connected to the motorcycle for pivotal movement about a fifth pivot axis that is disposed below the line connecting the first pivot axis and the rear wheel axis of rotation and to the rear of the fourth pivot axis when the vehicle is in an unladened condition.

PRIOR ART CONSTRUCTION

Figure 1:
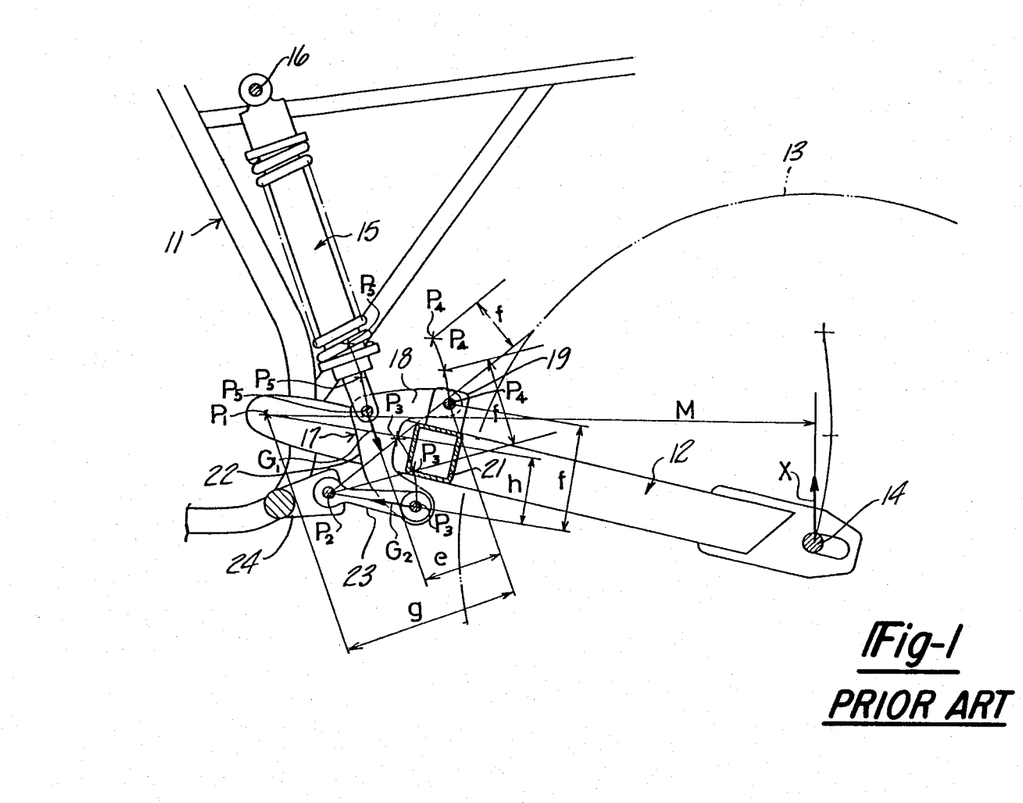
FIG. 1 is a side elevational view of a portion of a motorcycle embodying a rear wheel suspension system in accordance with a prior art construction, with portions broken away and other portions shown in section.
Figure 2:
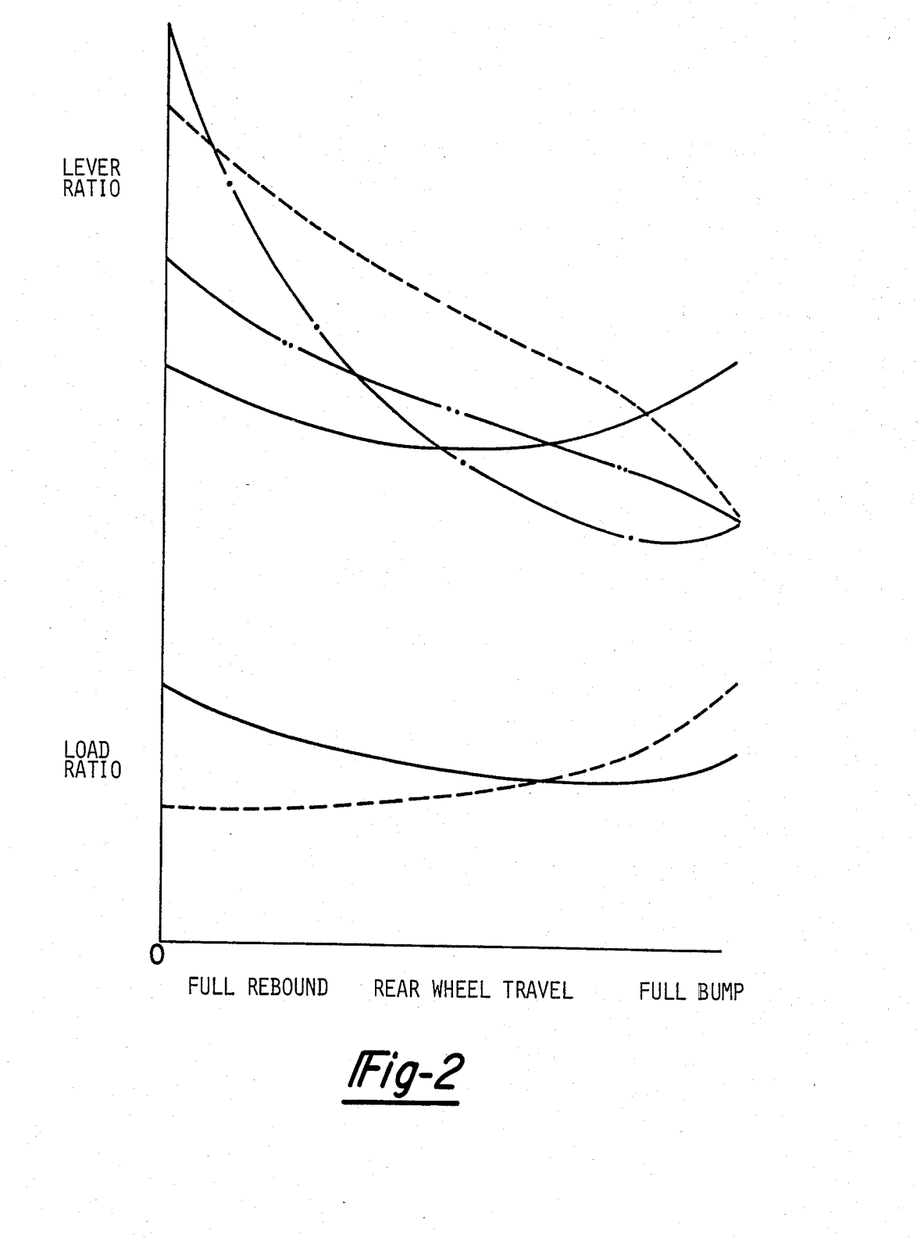
FIG. 2 is a graphical analysis showing suspension travel, load ratio and lever ratios of the prior art and of the invention.

The theory and operation of the invention is believed to be more apparent if a description of the prior art construction upon which this invention improves is described. Such an prior art arrangement is shown in FIG. 1 and some of the mechanical aspects of its operation are shown in the graphical representation of FIG. 2. Reference will first be had to FIG. 1 and FIG. 2, as it pertains to the prior art construction.

The invention relates primarily to a rear suspension for a motorcycle and a portion of a frame of a motorcycle having a rear wheel suspension in accordance with the prior art is identified generally by the reference numeral 11. A trailing arm assembly, indicated generally by the reference numeral 12, has a forward pivot point, indicated by the point $P_1$ upon the frame. The pivot axis $P_1$ extends substantially transversely to the longitudinal direction of the frame 11. In practice, the trailing arm assembly 12 may comprise a pair of interconnected arms each positioned on opposite sides of a rear wheel, shown in phantom and identified by the reference numeral 13. The rear wheel 13 is supported for rotation about a rotational axis 14 by the trailing arm assembly 12 in a known manner.

A suspension element, indicated generally by the reference numeral 15 is provided for cushioning the pivotal movement of the trailing arm 12 and, accordingly, the vertical movement of the wheel 13 relative to the frame 11. The suspension element 15 may be of any known type and, in the illustrated prior art construction, consists of a combined hydraulic shock absorber and coil spring assembly. The upper end of the suspension element 15 is pivotally connected to the frame 11 in any known manner about a pivot point 16. Because of the prior art suspension geometry, the suspension element 15 extends generally in a vertical direction.

A linkage system, now to be described, is interposed between the trailing arm 12 and the lower end of the suspension element 15 for transmitting loads between the rear wheel 13 and the suspension element 15 at a non-linear rate. The linkage system in includes a bellcrank, indicated generally by the reference numeral 17, which has its intermediate point pivotally connected to the lower end of the suspension element 15 about a pivot axis $P_5$. The bellcrank 17 has a first arm portion 18 that extends generally upwardly and rearwardly from the pivotal axis $P_5$ above a line connecting the pivot axis $P_1$ of the trailing arm 12 and the rotational axis 14 of the rear wheel 13. The rear end of the bellcrank arm 18 is pivotally connected to a bracket 19 that is affixed to the upper side of a cross member 21 of the trailing arm assembly 12. The pivot axis between the bellcrank arm 18 and bracket 19 is identified by the reference character $P_4$.

The bellcrank 17 has its other arm 22 extending rearwardly and downwardly from the pivot point $P_1$ and terminates below the line connecting the pivot axis $P_1$ and the rear wheel rotational axis 14. A link 23 is pivotally connected at its forward end to a bracket 24 of the frame assembly 11 for pivotal movement about a pivot axis identified by the character $P_2$. The rear end of the link 23 is pivotally connected to the bellcrank arm 22 about a pivot axis $P_3$.

FIG. 1 shows the suspension system as it appears in a full rebound condition. When a load X is applied to the rear wheel 13, the trailing arm 12 will pivot in a counterclockwise direction about the pivot point $P_1$. In a like manner, the bellcrank pivot point $P_4$ will rotate in a counterclockwise direction about the center $P_1$. The link 23 also will rotate upon suspension movement about its axis $P_2$ so that the pivot point $P_3$ will follow an arc about this axis. The respective pivotal movement of the points $P_4$ and $P_3$ about their respective arcs will cause the bellcrank 17 to rotate and move so as to load the suspension element 15 through the point $P_5$ at a non-linear rate as a result of the geometric relationships now to be described.

Initially it should be noted that in the full rebound condition, the suspension element 15 is inclined at a relatively small angle to the horizontal. That is, the pivot point $P_1$ and 16 are almost vertically aligned with each other with the pivot point 16 being positioned only slightly forwardly of the pivot point $P_1$. As a result, the suspension element 15 is restricted to a relatively short stroke along its line of action so that its cushioning effect will be limited to a relatively small amount of movement.

As has been noted, the force on the rear wheel 13 tending to cause it to move vertically relative to the frame 11 is identified by the force vector X. The force X acts in a vertical direction, however, the rear wheel axis 14 actually moves through an arc about the pivot point $P_1$. Loading forces on the rear wheel 13 are resisted by the suspension element 15 along its line of action by a force indicated by the vector $G_1$. At the same time, the bellcrank 17 loads the link 23 along its axis defined by the line connecting the points $P_2$ and $P_3$ with a force indicated by the vector $G_2$.

Considering now a free body diagram of the bellcrank 17 about its pivot point $P_4$ to the trailing arm 12, the sum of the moments of the various forces acting about the pivot point $P_4$ are equal. The two forces acting about the point $P_4$ are the forces $G_1$ and $G_2$. The force $G_1$ acts through a moment arm that is equal to the perpendicular distance between the point $P_3$ and the point $P_4$, which distance is identified by the dimension e. The force $G_2$ acts through a moment arm about the point $P_4$ identified by the dimension f, the perpendicular distance between the points $P_3$ and $P_4$. For the sum of the moments to be equal, the following relationship must hold:

$$G_1 e = G_2 f \qquad (1).$$

Considering now a free body of the trailing arm 12, the sum of the moments about the pivot axis $P_1$ must also be equal to zero. The rear wheel force X acts through a moment arm M which is equal to the perpendicular distance between the points $P_1$ and 14. This moment must be equal to the moments generated on the arm 12 by the forces $G_1$ and $G_2$. The force $G_1$ acts through a moment arm that is equal to the distance between the pivot points $P_1$ and $P_4$, the latter being the point at which the force $G_1$ acts upon the arm 12. This moment arm is identified by the dimension g. The force $G_2$ acts through a moment arm which is equal to the distance between the points $P_1$ and $P_3$, the point of action of the force $G_2$. This dimension is identified in the drawings by the character h. Therefore, the following equation holds true:

$$G_1 g + G_2 h = XM \qquad (2).$$

Solving equations (1) and (2) for $G_1$ and $G_2$, we obtain the following relationships:

$$G_1 = X \left( \frac{M}{g + \frac{eh}{f}} \right) = X \left( \frac{Mf}{fg + eh} \right); \qquad (3)$$

$$G_2 = X \left( \frac{M}{\frac{fg}{e} + h} \right) = X \left( \frac{Me}{fg + eh} \right). \qquad (4)$$

However, in relating $G_1$ and $G_2$ from equation (1) we know that the following equation is true:

$$G_2 = \frac{e}{f} G_1. \qquad (5)$$

From the foregoing, it is clear that the force exerted on the suspension element 15 ($G_1$) is equal to the force on the rear wheel X times the relationship $$\left(\frac{Mf}{fg+eh}\right).$$

This factor may be referred to as the lever ratio or the cushion lever ratio of the linkage mechanism to the shock absorber 15. The force $G_2$ exerted on the link 23 is equal to the wheel load X multiplied by the ratio $$\left(\frac{Me}{fg+eh}\right).$$

This ratio is the link lever ratio of the linkage mechanism to the link 23.

From equation (5), it is obvious that the ratio $e/f$ is the ratio between the loads on the link 23 and suspension element 15, i.e., the ratio $G_2$ over $G_1$.

Upon suspension travel as the wheel 13 becomes loaded, the arm 12 swings about the pivot point $P_1$. During this movement, the point $P_4$ also rotates about the pivot point $P_1$ whereas the pivotal connection $P_5$ of the bellcrank 17 to the suspension element 15 follows a generally parallel path. As a result of this movement, the length of the arm through which the force $G_1$ acts (e) changes very little during the suspension movement.

However, during this same suspension movement, the pivot point $P_3$ between the link 23 and the bellcrank 17 moves about the pivot point $P_2$ so that the distance or lever arm f is gradually diminished. Therefore, the ratio $e/f$ is gradually increased during suspension travel.

The effect of these changes in ratios may be best understood by reference to FIG. 2. In FIG. 2, the abscissa indicates the rear wheel travel with the zero point being full rebound. The lever ratios and load radios of the linkage systems in accordance with the prior art are shown on the graph and lever ratios and load ratios are indicated on the ordinate. The link lever ratio acting on the link 23 is identified by the solid line curve at the upper portion of this figure. The cushion lever ratio is indicated by the broken line curve. As may be seen from the upper portion of FIG. 2, the cushion lever ratio decreases with the amount of travel of the rear wheel from the full rebound condition. However, the actual ratio is always higher than the link lever ratio until a point near full bump condition is reached. Since the suspension element 15 has a relatively short stroke due to its orientation in the motorcycle, this has the effect of causing a bottoming out or abruptly increasing load on the suspension element 15 immediately prior to the full bump condition. At the same time, the force on the link 23 is also abruptly increased at the end of the suspension travel since the link lever ratio also rises abruptly at this point. As seen from the lower portion of FIG. 2, the ratio of the link load to the suspension element load increases abruptly at the end of full suspension travel. Hence, not only is there a substantially large load applied to the suspension element 15 at the end of the travel with the prior art construction, but also there is a very large load exerted on the frame 11 through the link 23. Hence, the entire frame assembly must be strengthened considerably which adds significantly to its weight.

DETAILED DESCRIPTION OF THE PREFERRED EMBODIMENT

As will become hereinafter apparent, the instant invention provides a suspension arrangement wherein the suspension element may be oriented so as to have a greater effective stroke than with the prior art type of construction as aforedescribed. In addition, the linkage system employed for loading the suspension element is effective to provide a greater effectiveness with a minimizing of shock loadings which are transmitted both to the suspension element and to the frame, particularly at the end of the suspension travel.

Figure 3:
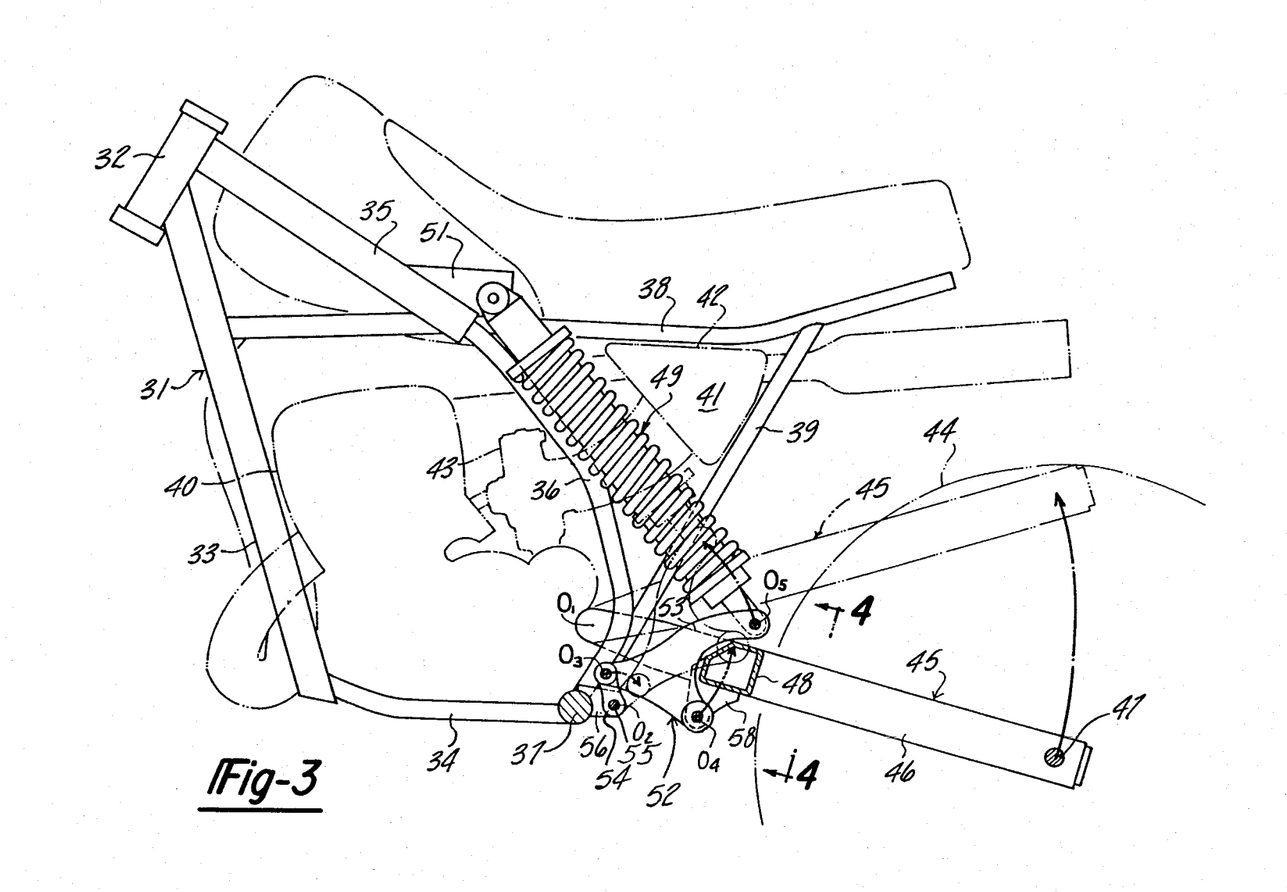
FIG. 3 is a side elevational view of a portion of a motorcycle embodying a rear wheel suspension system constructed in accordance with an embodiment of the invention, with portions shown in section and other portions broken away.
Figure 4:
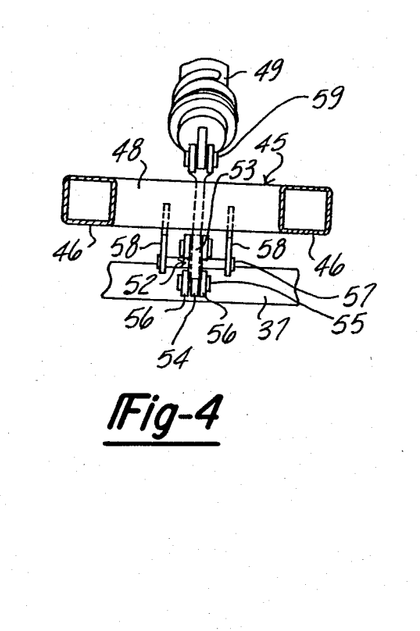
FIG. 4 is a cross-sectional view taken along the line 4—4 of FIG. 3.
Figure 5:
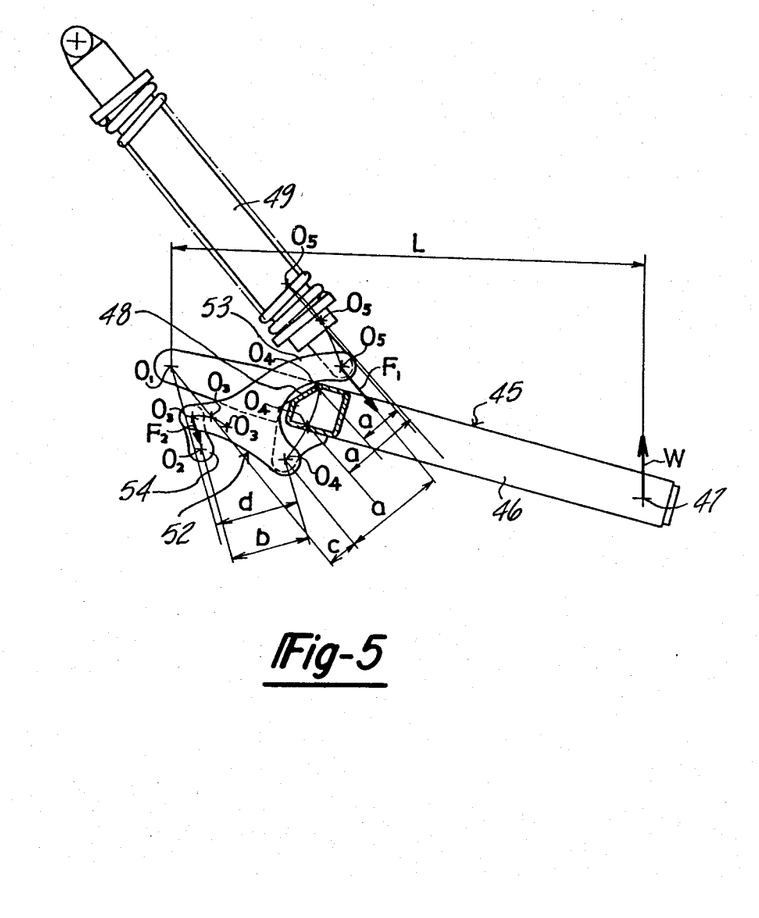
FIG. 5 is a schematic view of the suspension system of the embodiment of FIG. 3 showing the graphical representation of the loading and operation of the various elements.

Referring now specifically to FIGS. 3 through 5, a motorcycle constructed in accordance with an embodiment of the invention is shown partially. Inasmuch as the invention relates to the suspension system for the rear wheel of the motorcycle, only this portion of the construction has been shown in full detail.

The motorcycle includes a frame assembly, indicated generally by the reference numeral 31. The frame assembly 31 includes a head pipe 32 that rotatably journals a front fork and front wheel (not shown) in a known manner. A down tube 33 is affixed to the lower end of the head pipe 32 and has a rearwardly extending portion which may comprise a pair of forked portions 34 affixed to its lower end. A main pipe 35 is also affixed to the head pipe 32 and extends rearwardly and downwardly. Seat pillar tubes 36 are affixed to the rear end of the main pipe 35 and extend downwardly and are connected to a cross tube 37 which, in turn, is connected to the rear ends of the forked portions 34 so as to define a generally closed configuration in which an engine and transmission, shown in phantom and indicated by the reference numeral 40, is positioned.

The frame 31 also includes seat rails 38 that extend rearwardly and which are supported, at their rear end, by back stays 39. The back stays 39 extend upwardly from the cross tube 37 so as to provide further frame reinforcement.

The construction of the frame is such that a generally open triangular area is formed between the seat pillar tubes 36, back stays 39 and seat rails 38. An air cleaner assembly 42 may be positioned to one side of this triangular area to supply filtered air to a carburetor 43 of the engine 40.

A rear wheel, shown in phantom and identified by the reference numeral 44 is rotatably supported by a suspension arm assembly, indicated generally by the reference numeral 45. The suspension arm assembly 45 has a pair of trailing arm portions 46 that journal the wheel 44 for rotation about an axis indicated by the reference numeral 47. An interconnecting portion 48 joins the arms 46 ahead of the rear wheel 44 to add strength to the assembly. The forward end of the arm 45 is journalled on the frame in a known manner about a transversely extending pivot axis indicated by the reference character $O_1$. A suspension element, indicated generally by the reference numeral 49, is provided for cushioning the movement of the rear wheel 44 and the pivotal movement of the trailing arm assembly 45. The suspension element 49 is, in the illustrated embodiment, a combined hydraulic shock absorber and coil spring assembly. Unlike the prior art, however, the suspension element 49 is disposed at a substantially inclined angle to the vertical.

The suspension element 49 extends primarily through the gap 41 to one side of the air cleaner 42. The forward uppermost end of the suspension element 49 is connected to the frame 31 for pivotal movement by means of a bracket 51 that is affixed, as by welding, to the main tube 35. The rearward end of the suspension element 49 is arranged so as to be loaded upon movement of the rear wheel 44 by means of a linkage system, indicated generally by the reference numeral 52, in a manner to be described.

The linkage system 52 includes a bellcrank, indicated generally by the reference numeral 53. The bellcrank 53 has its intermediate point connected by means of a pivot pin about a pivotal axis $O_3$ to one end of a link 54. The pivot axis $O_3$ is disposed below a line connecting the axis $O_1$ with the rear wheel axis of rotation 47 and is disposed closely adjacent to the pivot axis $O_1$ when the motorcycle is in a full rebound condition. The lower end of the link 54 is pivotally supported about a pivot axis $O_2$ defined by a pivot pin 55 which is pivotally supported by means of a pair of brackets 56 that are affixed, as by welding, to the frame tube 37. The pivot axis $O_2$ is also positioned below a line connecting the axis $O_1$ with the rear wheel axis of rotation 47 and also below the pivot axis $O_3$. When the motorcycle is in its full rebound condition, the axis $O_3$ is positioned forwardly of the axis $O_2$.

One arm of the bellcrank 53 has a pivotal connection at a pivot axis $O_4$ to a pivot pin 57 which is in turn is pivotally connected to a pair of brackets 58 that are welded to and depend from the suspension arm cross tube 48. The pivot axis $O_4$ is disposed below the suspension arm 45 and to the rear of the pivot axes $O_1$, $O_2$ and $O_3$.

The other arm of the bellcrank 53 is pivotally connected to the suspension element 49 at a pivot axis $O_5$ defined by a pivot pin 59. The pivot axis $O_5$ is disposed above the line connecting the axis $O_1$ with the rear wheel axis of rotation 47 and above the suspension arm 45. The axis $O_5$ is also disposed rearwardly of the axes $O_1$, $O_2$ and $O_3$ and rearwardly of the axis $O_4$ when the suspension is in its full rebound condition.

It should be readily apparent that the configuration of the bellcrank 53 is such that the suspension element 49 is positioned at a relatively shallow angle to the horizontal or a relatively great angle to the vertical in comparison to suspension systems of the type wherein the suspension element extends generally vertically. As a result, the shock suspension element 49 can have a large cushioning stroke and is possible therefore to achieve good suspension characteristics.

The geometric relationships during suspension travel will now be described primarily by reference to FIGS. 5 and 2. During suspension movement, a force, indicated by the vector W is applied to the rear wheel 44 in a vertically extending direction so as to cause pivotal movement of the suspension arm 45 in a counterclockwise direction about the point $O_1$. This movement is resisted by a force of the suspension element 49, indicated by the vector $F_1$ acting through the pivot point $O_5$. In addition, a force is exerted on the link 54 in the direction of the line $O_3$, $O_2$ in an amount indicated by the vector $F_2$.

Considering first a free body diagram of the bellcrank 53 about the pivot point $O_4$, the sum of the moments is equal to zero. The force $F_1$ of the suspension element 49 acts through a lever arm having the dimension a, which is the distance between the axes $O_4$ and $O_5$ in a direction perpendicular to the line of the force vector $O_1$. The moment arm of the link force $F_2$ is equal to the distance identified by the character b which is the perpendicular distance between the force vector $F_2$ and the point $O_4$ about which it acts. Hence, the following relationship holds true:

$$F_1 a = F_2 b \tag{1}$$

Considering now a free body diagram of the trailing arm 45, the sum of the moments about the pivot axis $O_1$ also must be equal to zero. That is, the wheel force W multiplied by its lever arm around the axis $O_1$ should be equal to the sum of the moments of the forces $F_1$ and $F_2$ times their effective moment arms around the axis $O_1$. The wheel force W acts over a moment arm equal to the distance L, which is the perpendicular distance between the force vector W and the axis $O_1$. In a like manner, the moment arm of the force $F_1$ is equal to the distance between the axis $O_1$ and the axis $O_4$, through which the force $F_1$ acts on the suspension arm 45 perpendicular to the direction of the force vector $F_1$. This distance is identified by the reference character c in the drawings.

The moment arm of the force vector $F_2$ is equal to the distance between the point $O_2$ and the point $O_4$ through which the force $F_2$ acts, perpendicular to this force vector. This distance is identified by the dimension d in the drawings. Using these dimensional relationships, the following equation must hold true:

$$F_1 c + F_2 d = WL \tag{2}$$

Solving equations (1) and (2) for the loads $F_1$ and $F_2$, we obtain the following relationships:

$$F_1 = W\left(\frac{L}{c + \frac{ad}{c}}\right) = W\left(\frac{Lb}{bc + ad}\right); \tag{3}$$

$$F_2 = W\left(\frac{L}{\frac{bc}{a} + d}\right) = W\left(\frac{La}{bc + ad}\right). \tag{4}$$

Solving equation (1) for $F_2$, we obtain the following:

$$F_2 = \frac{a}{b} F_1. \tag{5}$$

From equations (3) and (4), it should be readily apparent that the cushioning lever ratio of the linkage system 52 is equal to $$\left(\frac{Lb}{bc + ad}\right).$$

In a like manner, the link lever ratio of the linkage system 52 acting on the link 54 is equal to $$\left(\frac{La}{bc + ad}\right).$$

Thus, the relationship between the is equal to the ratio a/b.

As the wheel 44 moves upwardly from its full rebound condition, the suspension arm 45 rotates about the point $O_1$. As this movement occurs, the pivot point $O_3$ between the link 54 and the bellcrank 53 follows a clockwise curvature as shown in FIG. 5 about the axis $O_2$. At the same time, the pivot point $O_5$ between the bellcrank 53 and the suspension element 49 follows a rather gradual arcuate loci as also shown in this figure which is generally along about the same line as that traversed by the pivot axis $O_4$ during the suspension movement. As a result of these relationships, the length a of the lever arm of the force $F_1$ about the axis $O_4$ is gradually reduced.

The effect of this relationship may be best understood by reference to FIG. 2 wherein the ratios of this embodiment with the prior art arrangement are superimposed.

The link lever ratio of the forces acting on the link 54 is represented at the upper portion of the curve of FIG. 2 by the dot-dash line. The suspension element lever ratio is as indicated by the dot-dot-dash line. It will be noted that the cushion lever ratio is always lower than that with the prior art construction and is gradually decreased throughout the entire suspension travel. This means that the load applied to the suspension element is lower than that as with the prior art and this coupled with the longer effective travel provides significantly improved damping even though the load applied is relatively low. The link lever ratio acting on the link 54 starts out higher than that of the suspension element lever ratio but crosses over at a point which may be less than normal unladened height so that the forces applied to the link and frame are substantially lower than with the prior art. Hence, it is possible to substantially reduce the forces which are applied to the frame and to the suspension element. Also, the link lever ratio becomes lower than that of the prior art at approximately this same time.

In accordance with the construction of this invention, as will be apparent from the lower portion of FIG. 2, the load ratio of this invention starts out higher than that of the prior art construction and gradually diminishes so that under normal suspension travels, it is considerably less than that of the prior art. Hence, the loading on the suspension element at full bump is considerably less than that upon the link which is pivotally connected to the frame, thus reducing further frame loadings and loadings on the linkage. Even though the load ratio is higher initially, the actual forces encountered at this time are substantially lower and this presents no design problem. Furthermore, this high load ratio prevents any abrupt returns from the full rebound state such as occur under kickback due to the high lever load ratio at this point.

It should be readily apparent from the foregoing description that this arrangement provides a very good effective loading of the suspension components, permits a longer stroke of the suspension element that with the prior art and also reduces the loading applied to the frame under large loading conditions. Furthermore, since the linkage system is positioned at a low level relatively to the suspension arm, the center of gravity is made lower with this arrangement.

Although an embodiment of the invention has been shown and described, various changes and modifications may be made without departing from the spirit and scope of the invention, as defined by the appended claims.

I claim:

1. A rear suspension for a motorcycle comprising a suspension arm supported for pivotal movement about a first pivot axis that extends transversely to said motorcycle, a rear wheel journalled by said suspension arm for rotation about an axis that is parallel to said first axis, and a suspension element for yieldably resisting pivotal movement of said suspension arm, the improvement comprising linkage means for loading said suspension element upon pivotal movement of said suspension arm comprising a bellcrank having its intermediate pivotal connection to said suspension arm for pivotal movement about a second pivot axis that is disposed rearwardly from said first pivot axis and below a line interconnecting said first pivot axis with said wheel axis of rotation, one arm of said bellcrank having a pivotal connection to one end of said suspension element about a third pivot axis for loading said suspension element upon pivotal movement of said bellcrank about said second pivot axis, said third pivot axis being disposed rearwardly of said second pivot axis and above the line connecting said first pivot axis with said wheel axis of rotation, the other arm of said bellcrank having a connection to one end of a link at a fourth pivot axis, said fourth pivot axis lying forwardly of said second and third pivot axis and being disposed below the line interconnecting said first pivot axis with said wheel rotational axis, and means connecting the other end of said link to said motorcycle for pivotal movement about a fixed fifth pivotal axis that is disposed below the line connecting said first pivot axis and said rear wheel axis and to the rear of said fourth pivot axis when said vehicle is unladened.

2. A rear suspension as claimed in claim 1 wherein the suspension element comprises a combined spring and shock absorber assembly.

3. A rear suspension as claimed in claim 2 wherein the suspension element is disposed with its line of action extending at an angle to the vertical and with the upper end positioned forwardly of the motorcycle relative to its lower end.

* * * * *

UNITED STATES PATENT AND TRADEMARK OFFICE
CERTIFICATE OF CORRECTION

PATENT NO. : 4,515,236

DATED : May 7, 1985

INVENTOR(S) : Takashi Kanamori

It is certified that error appears in the above-identified patent and that said Letters Patent is hereby corrected as shown below:

```
Column 1, line 10, "a" (first occurrence) should be -- as --.
Column 2, line 3, after "first" insert -- pivot --.
Column 2, line 51, "an" should be -- a --.
Column 3, line 19, after "system" delete -- in --.
Column 4, line 60, after "G₁", "and" should be -- to --.
Column 5, line 38, "radios" should be -- ratios --.
Column 6, line 21, "numberal" should be -- numeral --.
Column 8, line 65, after "the" (second occurrence) insert
-- link load and the cushioning load --.
Column 10, line 42, "pivotal" should be -- pivot --.
```

Signed and Sealed this

Twenty-second Day of July 1986

[SEAL]

Attest:

DONALD J. QUIGG

Attesting Officer

Commissioner of Patents and Trademarks